J. R. HILL.
Car Coupling.
No. 50,824. Patented Nov. 7, 1865.
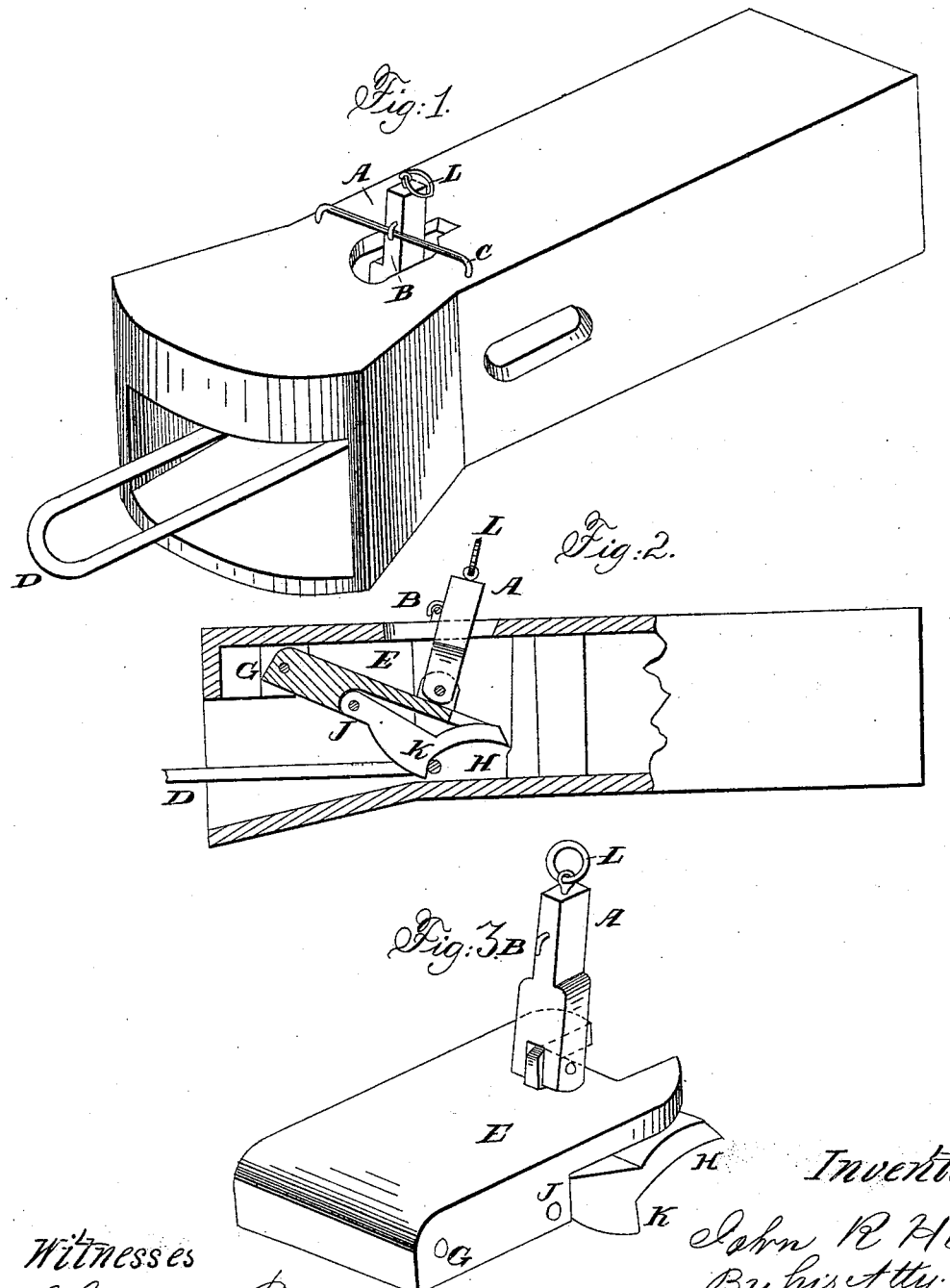

UNITED STATES PATENT OFFICE.

JOHN R. HILL, OF MILLVILLE, NEW JERSEY.

IMPROVED COUPLING FOR RAILROAD-CARS.

Specification forming part of Letters Patent No. 50,824, dated November 7, 1865

*To all whom it may concern:*

Be it known that I, JOHN R. HILL, of Millville, Cumberland county, State of New Jersey, have invented a new and Improved Car-Coupling; and I do hereby declare the following to be a clear and exact description thereof, reference being had to the accompanying drawings, and to the letters of reference marked thereon, making a part of this specification.

The nature of my invention consists in the shape and construction of the self-adjusting coupling.

Figure 1 represents the ordinary cast-iron box that contains the coupling devices, and shows the proper position of the lever A and how it is attached by a hook, B, to the cross-rod C at the top of the platform of a car, so that the coupling is ready to receive the link D of the next car, and the link is then held by the self-acting coupling and the cars are connected. Fig. 2 represents a sectional view of the coupling; Fig. 3, a perspective view.

The lever A is connected by a hinge or pivot to the top part, E, of the coupling that works upon a pivot or hinge, G. The double-curved catch H operates on a pivot or hinge, J, attached to the top device, E. The catch is curved in front to allow the link D to pass under it, and has a shoulder, K, at the point to catch and hold the link D and prevent it from disconnecting until the conductor raises the lever by the ring L and the cars are uncoupled.

What I claim as my invention, and desire to secure by Letters Patent, is—

The shape and construction of the jointed car-coupling and lever combined, as herein described, and for the purposes set forth.

Witnesses:                       JOHN R. HILL.
   J. FRANKLIN REIGART,
   EDM. F. BROWN.